(12) United States Patent
Salmon (10) Patent No.: US 10,082,826 B1
(45) Date of Patent: Sep. 25, 2018

(54) METHOD AND SYSTEM FOR DEPLOYING A FLEXIBLE DEVICE

(71) Applicant: I-BLADES, INC., Milpitas, CA (US)

(72) Inventor: Peter C. Salmon, Mountain View, CA (US)

(73) Assignee: I-BLADES, INC., Milpitas, CA (US)

( * ) Notice: Subject to any disclaimer, the term of this patent is extended or adjusted under 35 U.S.C. 154(b) by 1093 days.

(21) Appl. No.: 13/666,187

(22) Filed: Nov. 1, 2012

Related U.S. Application Data

(60) Provisional application No. 61/553,955, filed on Nov. 1, 2011.

(51) Int. Cl.
*G06F 1/16* (2006.01)
*G09F 9/30* (2006.01)

(52) U.S. Cl.
CPC .......... *G06F 1/1615* (2013.01); *G06F 1/1601* (2013.01); *G09F 9/301* (2013.01)

(58) Field of Classification Search
None
See application file for complete search history.

(56) References Cited

U.S. PATENT DOCUMENTS

| 6,137,454 A | 10/2000 | Peck | |
| 6,806,850 B2 * | 10/2004 | Chen | G06F 1/1616 345/7 |
| 7,415,289 B2 | 8/2008 | Salmon | |
| 2002/0070910 A1 * | 6/2002 | Fujieda | G06F 1/1615 345/85 |
| 2002/0118151 A1 * | 8/2002 | Chen | G06F 1/1616 345/84 |
| 2003/0001488 A1 * | 1/2003 | Sundahl | H01L 51/529 313/483 |
| 2003/0160892 A1 * | 8/2003 | Tamura | H04N 5/2251 348/333.07 |
| 2005/0040962 A1 * | 2/2005 | Funkhouser | G06F 1/1601 340/815.4 |
| 2006/0038745 A1 * | 2/2006 | Naksen | G06F 1/1624 345/30 |
| 2006/0107566 A1 * | 5/2006 | Van Rens | G09F 9/35 40/515 |

(Continued)

FOREIGN PATENT DOCUMENTS

WO    WO 2008/059345 A2    5/2008

OTHER PUBLICATIONS

Merriam-Webster definition of "Telescoping." https://www.merriam-webster.com/thesaurus/telescoping.*

*Primary Examiner* — Kent W Chang
*Assistant Examiner* — Nathaniel P Brittingham
(74) *Attorney, Agent, or Firm* — Kilpatrick Townsend & Stockton LLP (57) ABSTRACT

A device includes a processor and memory coupled to the processor. The memory is encoded with instructions that are executable by the processor to provide content signals. The device also includes a display screen extendable to present an extended portion comprising display pixels configured to display content using the content signals. The display screen comprises a scroll element which may provide a base substrate on which thin film circuits are fabricated, and may also provide motive force during retraction. The scroll element is attached to a pull bar and the pull bar is attached to an extensible support member that provides support during extension and retraction of the display screen.

16 Claims, 4 Drawing Sheets

(56) References Cited

U.S. PATENT DOCUMENTS

| | | | |
|---|---|---|---|
| 2007/0211036 A1* | 9/2007 | Perkins | G06F 1/1615 345/173 |
| 2008/0247126 A1 | 10/2008 | Otsuka et al. | |
| 2008/0284971 A1* | 11/2008 | Park | G02F 1/133305 349/158 |
| 2009/0128785 A1* | 5/2009 | Silverstein | G03B 21/56 353/119 |
| 2010/0075447 A1* | 3/2010 | Lee | H01L 51/003 438/23 |
| 2010/0157180 A1* | 6/2010 | Doane | G02F 1/1334 349/25 |
| 2010/0182738 A1* | 7/2010 | Visser | G06F 1/1613 361/679.01 |
| 2010/0194785 A1* | 8/2010 | Huitema | G02F 1/133305 345/690 |
| 2011/0018820 A1* | 1/2011 | Huitema | G06F 1/1601 345/173 |
| 2011/0043479 A1* | 2/2011 | van Aerle | G06F 1/1601 345/174 |
| 2011/0057895 A1* | 3/2011 | Tseng | G06F 1/1647 345/173 |
| 2012/0032902 A1* | 2/2012 | Chiang | G06F 1/1647 345/173 |
| 2012/0066630 A1* | 3/2012 | Kim | G06F 3/0481 715/769 |
| 2012/0080217 A1* | 4/2012 | Kim | G06F 3/044 174/256 |
| 2013/0016497 A1* | 1/2013 | Anderson | G09F 9/301 362/97.1 |
| 2013/0058063 A1* | 3/2013 | O'Brien | G06F 1/1624 361/807 |

* cited by examiner

METHOD AND SYSTEM FOR DEPLOYING A FLEXIBLE DEVICE

CROSS-REFERENCES TO RELATED APPLICATIONS

This application claims priority to U.S. Provisional Patent Application No. 61/553,955, filed on Nov. 1, 2011, entitled "Method and System for Deploying a Flexible Device," the disclosure of which is hereby incorporated by reference in its entirety for all purposes.

TECHNICAL FIELD

This invention relates to modular display devices and touch screens and more particularly to compact electronic systems with extendable flexible devices.

BACKGROUND OF THE INVENTION

The size of electronic devices ranges from the very small to the very large. Gaming devices, portable data assistants (PDAs) and other portable computing devices, laptops, cell phones, smart phones, video players, music players, medical devices, and numerous other types of electronic devices are typically provided in sizes and shapes that are convenient for a user to hold, carry, and transport, for example, by being able to fit within a user's purse or pocket. For example, portable electronic devices are beginning to be used as personal computing platforms, combining computational power and communication capabilities with user convenience in a compact form. Typically such devices include a display used to present pertinent information to the user and, in some cases, the display surface can also be used as a touch sensitive input device. A popular form of such a portable electronic device fits comfortably in a shirt pocket. Other useful forms include non-mobile devices having retractable displays; for example these might be used on the desk of a student or a business professional, or attached to the seat of an automobile or an aircraft.

Existing flexible devices have typically been mechanically complex, making them bulky and heavy and awkward to use. There remains a need for a simple retraction mechanism that is compact and light-weight; this can lead to a flexible device that is easy to use, inexpensive to manufacture, and suitable for both mobile and fixed devices. Thus, despite the progress made in electronic devices, there is a need in the art for improved methods and systems for making and using flexible devices.

SUMMARY OF THE INVENTION

The present invention relates generally to electronic devices. More specifically, the present invention relates to methods and systems for electronic devices having retractable or roll up elements. Particular embodiments of the present invention enable increased display size while retaining portability. Merely by way of example, the invention has been applied to electronic devices having screens or other display elements for displaying images, keyboard elements, sound producing elements, heating/cooling elements, and/or other elements that are retractable or rollable.

According to an embodiment of the present invention, a device is provided. The device includes a processor and a memory coupled to the processor. The memory is encoded with instructions that are executable by the processor to provide content signals. The device also includes a display screen extendable to present an extended portion comprising display pixels configured to display content using the content signals. The display screen comprises a scroll element. When released, the scroll element spontaneously rolls itself up on a suitable shaft. The screen may be extended by a user pulling on a pull bar attached to the leading edge of the scroll element, and an extensible support member may be attached to the pull bar to hold the display in the extended position.

In another embodiment a device is provided that includes a processor in an enclosure and a scroll element having a retracted form and an extended form, wherein the scroll element spontaneously coils inside the enclosure when released, and the extended form extends from the enclosure to present an extended portion comprising transducers that are coupled to the processor.

In other embodiments methods of fabricating flexible devices are described. The methods include forming a flexible substrate into a scroll element either before or after fabricating circuits on the flexible substrate.

Numerous benefits are achieved by way of the present invention over conventional techniques. For example, certain embodiments of the present invention provide solutions to conventional devices in which the degree of portability is usually accompanied by a small-sized display that may be considered ill-suited for some applications, such as, but not limited to watching video, viewing or editing large documents, reviewing or creating emails, and performing spreadsheet calculations. Utilizing certain embodiments of the present invention, large display areas are provided as suitable for the above applications, in devices that may be carried in a user's pocket.

These and other embodiments of the invention along with many of its advantages and features are described in more detail in conjunction with the text below and attached figures.

DETAILED DESCRIPTION OF SPECIFIC EMBODIMENTS

To facilitate winding and unwinding a flexible device may employ a scroll. A scroll is defined herein as an elastic structure comprised of flexible material that will inherently roll itself up when released from mechanical constraints. The scroll may serve as the only substrate for circuits fabricated thereon, or it may comprise one of a plurality of layers that collectively exhibit the roll up behavior of a scroll. If the scroll is loosely wound on a shaft, it may be extended by pulling on its leading edge; when the pulling force is removed the scroll will spontaneously roll itself up. The use of a scroll may eliminate the need for a motor or actuator, saving cost as well as producing a retractable device having a compact form factor and low weight.

An embodiment of the present invention relates to an electronic device comprising a processor and a memory coupled to the processor, wherein the memory is encoded with instructions that are executable by the processor to provide content signals, and a display screen is extendable to present an extended portion comprising display pixels configured to display content using the content signals. The display screen is coiled like a scroll when it is retracted; it has a pull bar at its leading edge, and the pull bar is attached to an extensible support member for support of the display screen during extension and retraction.

Another embodiment of the present invention relates to a device comprising an enclosure and an element having a retracted form and an extended form. The retracted form is a scroll inside the enclosure and the extended form is pulled from the enclosure using a pull bar to present an extended portion comprising transducers. The extended portion is supported by an extensible member. The transducers may convert electrical signals originating from a processor or display memory to display a pixel-based electronic image; they may also convert touch input on a surface of the extended portion to signals provided to a processor, and they may additionally or alternatively also produce sound, heat, or cooling. The display screen may also additionally or alternatively comprise passive elements and be used as a projection screen.

A further embodiment of the present invention relates to a method for deploying a flexible device having a flexible substrate. The flexible substrate is formed into a scroll element, preferably using heat forming. A pull bar is attached to the leading edge of the scroll element, and an extensible support member is mechanically coupled to the pull bar. A user may pull on the pull bar to extend the substrate for use, and a clamping means is provided to hold the substrate in the extended position. When done, the clamping means is released and the substrate rolls up. The user may assist the roll up by pushing on the pull bar. A further embodiment provides a pair of constant force springs to provide additional motive force for retraction. The extensible member provides support to the display screen during both extension and retraction.

Figure 1:
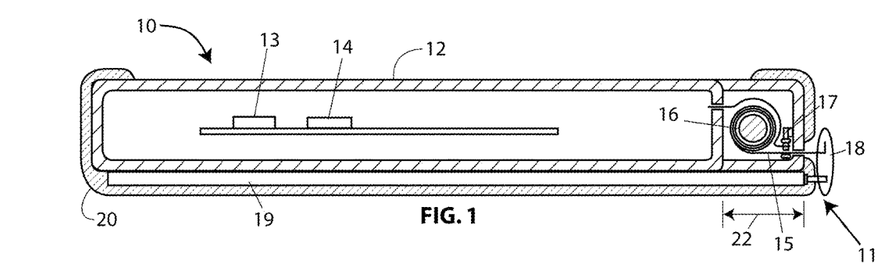
FIG. 1 is a cross-sectional view of a mobile device having a flexible peripheral device attached, wherein the peripheral device is in retracted form.

FIG. 1 depicts in cross-section a mobile device 10 incorporating a flexible peripheral device 11, in this case a display screen. Peripheral device 11 may be described as a retractable device, a roll up device, or a flexible device. Device 10 may be described as a retractable device or a roll up device since at least one element has this capability. Device 10 includes an enclosure 12, a processor 13, a memory 14 coupled to the processor, and an attached assembly 22 comprising components of flexible peripheral device 11. Assembly 22 includes a scroll element 15. Scroll element 15 may also be called a scroll or a scrollable member, and these terms may be used interchangeably. When rolled up, the inner diameter of scroll element 15 is slightly larger than the diameter of shaft 16 so that it can spin freely on shaft 16. Scrollable member 15 may be formed by heat treating in its retracted form, to be further described; thereafter it will have an inherent rotational stiffness and will resist unwinding. During extension, as it is unwound from shaft 16, scroll element 15 desirably asserts only a horizontal force on shaft 16. The ends of shaft 16 may rotate freely within counter bores provided in enclosure 12. A clamping assembly 17 is shown, and a pull bar 18 is also shown. An extensible support member 19 is shown, and support member 19 may extend in a telescoping manner. Assembly 22 and extensible member 19 may be integrated into mobile device 10 with the aid of a soft but durable cover 20. Cover 20 may help to protect the device from contaminants including fluids and debris, and may also protect the device when dropped.

In order to create a stiffened scroll, scroll element 15 may comprise polyethylene naphthalate (PEN) film and may be heated to around 160° C. while in the rolled up state, then cooled slowly. Slow cooling is desirable to increase the ratio of crystalline to amorphous material in the film for increased stiffness; a cooling time of 1 hour to ambient temperature is preferred. The scroll is stiffened to provide sufficient motive force to roll up a single layer or a plurality of layers, but it remains elastic after this heat treatment. An example of a sufficient motive force is a two ounce-inch torque produced by the scroll in a flexible display having a diagonal dimension of 9 inches.

Figure 2:
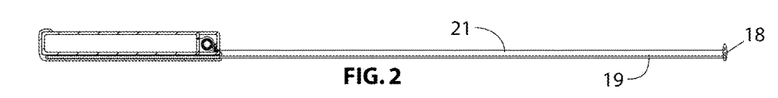
FIG. 2 is a cross-sectional view of the device of FIG. 1 in extended form.

FIG. 2 shows mobile device 10 in its extended form. Display screen 21 is shown, also pull bar 18 and telescoping support member 19.

Figure 3:
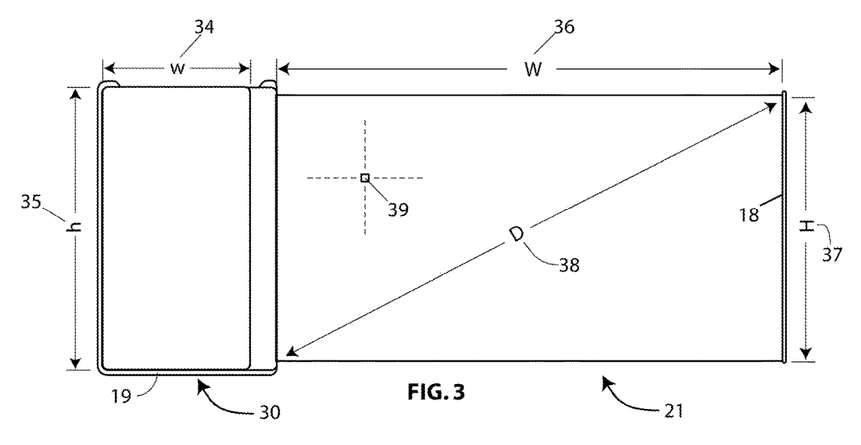
FIG. 3 is a top view of the extended device of FIG. 2.

FIG. 3 is a top view of mobile device 10 in extended form. This figure depicts mobile device 10 as a smart phone 30 with an extended display screen 21. The figure is drawn at a scale of approximately 50%. Smart phone 30 has a typical width dimension 34 of around 2.3 inches and a height dimension 35 of around 4.5 inches. Other shapes and sizes are of course possible. Display screen 21 has a typical width dimension 36 of around 8.0 inches and a height dimension 37 of around 4.2 inches. In this case, display screen 21 has a diagonal measure D, 38 of 9 inches. Thus in this example display screen 21 provides a display area of 33.6 square inches compared with a display area of 5.64 square inches for the smart phone, an increase of almost six times. Many users will greatly prefer the larger display screen for performing tasks such as watching movies or television, reading or writing emails, preparing large documents, or interpreting complex medical images; these are provided as examples only and are not intended to be limiting. A single display pixel 39 of display screen 21 is shown; pixels 39 are arrayed in the x and y directions to fill the entire viewing area of display screen 21. Each pixel comprises display circuits operable to emit or reflect light, wherein the display circuits may be coupled to a processor provided in smart phone 30.

Figure 4:
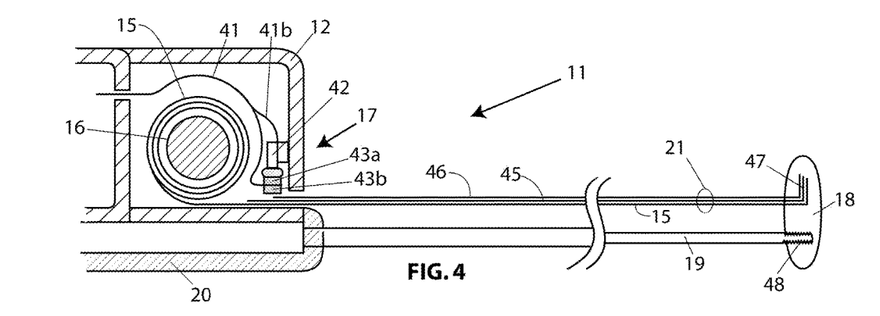
FIG. 4. is an expanded cross-sectional view of the flexible peripheral device in extended form.

FIG. 4 is an expanded cross-sectional view of flexible peripheral device 11 of FIG. 1 showing several turns of scroll element 15 remaining on shaft 16, with display screen 21 fully extended. A flex circuit 41 may carry content signals from the processor to the display screen and may also carry control signals on a branch 41b of the flex circuit, for controlling clamping assembly 17. Clamping assembly 17 is shown comprising a solenoid or other actuator 42 which may be activated by the processor to press the clamping assembly against display screen 21. Display screen 21 is further detailed to show scroll element 15 plus optionally a metal substrate layer 45 and a plastic substrate layer 46. A single metal layer or a single plastic layer comprising the scroll element may also be used, with thin film devices fabricated thereon. Alternatively, the metal layer may comprise a display circuit and the plastic layer may comprise a touch circuit for example. The layers may be continuously bonded together, or they may be connected only at pull bar 18, consequently free to slide against one another in tiny amounts during winding and unwinding. If metal layer 45 and plastic layer 46 are used, they may each terminate near clamping device 17 as shown, in order that signals may be interconnected between conductive traces and contact points on flex circuit 41 and corresponding contact points and conductive traces (not shown) on both the metal layer 45 and the plastic layer 46. Compliant pads 43*a* and 43*b* are provided, wherein pad 43*b* may be an anisotropic conductive film (ACF). Pad 43*b* preferably allows interconnection between contact pads (not shown) on the mating surfaces without requiring fine alignment between them. Other clamping devices can be employed; for example a cam mechanism may be used. Friction in telescoping member 19 may be sufficient to stabilize display screen 21 in the fully extended position, without requiring any additional clamping. For a robust mechanical termination of layers 15, 45, and 46 at pull bar 18, films 15, 45, and 46 may be provided with a right angle termination 47 as shown. A set screw provided in pull bar 18 may also be used. By providing a single point or line of common attachment as shown at termination 47, components 15, 45, and 46 of display screen 21 may be free to slide slightly against one another, with the desired result that stress in the films is reduced and wrinkles may be avoided during winding and unwinding. Extensible member 19 may have a threaded end 48 for terminating with pull bar 18.

Clamping assembly 17 provides an additional means for holding the flexible device in its extended form. Use of such a clamping device may eliminate the need for a separate holding device such as a ratchet mechanism.

Films 45 and 46 in scroll assembly 22 may be configured to exhibit a "memory set" or a "coil set" behavior. "Coil set" may be defined as the natural curvature remaining in a coil after it has been unwound. Torque produced in layers 45 and 46 due to coil set will combine with torque produced in the heat formed scroll element 15. Support member 19 is provided with sufficient stiffness to overcome these effects in the extended flexible device. Since the combined effects may comprise a total torque of just a few ounce inches, support member 19 may be a slender and unobtrusive element.

Figure 5:
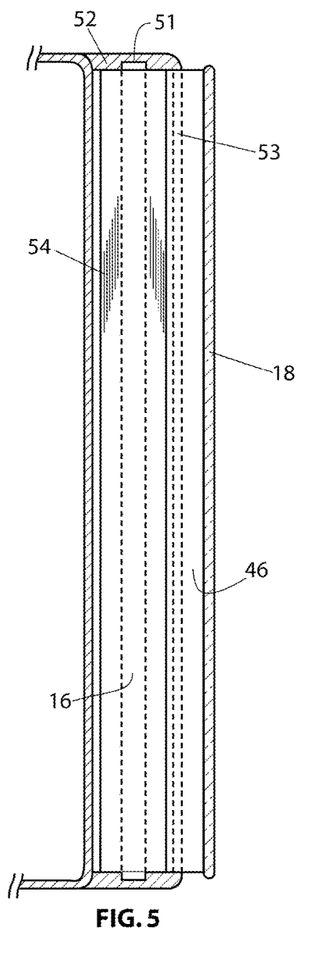
FIG. 5 is a cross-sectional view of a shaft assembly of the mobile device of FIG. 1 incorporating a scroll.

FIG. 5 is a cross-sectional view of attached assembly 22 of FIG. 1 viewed from the top. Shaft 16 is shown extending at each end into a counterbore 51 in a sidewall 52 of enclosure 11. An end wall 53 of enclosure 11 is also shown. Optional plastic layer 46 is also visible as the top layer of display screen 21. Layers 54 of the scroll assembly are shown wound around shaft 16, although they are preferably not gripping shaft 16.

Figure 6:
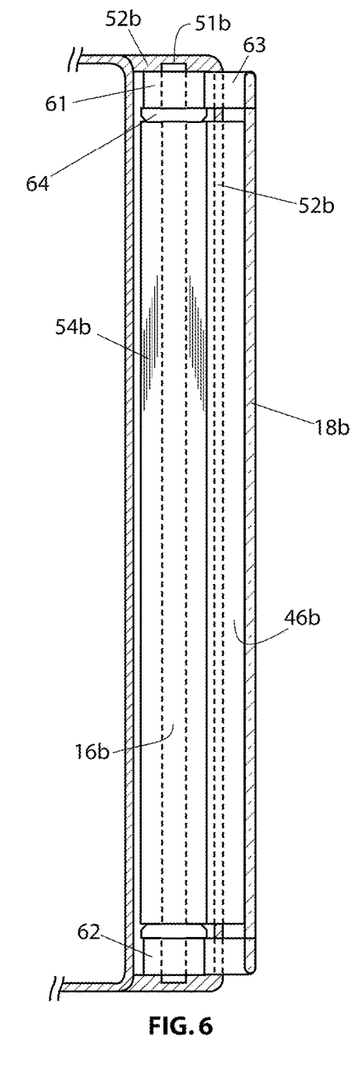
FIG. 6 is a cross-sectional view of a shaft assembly of the mobile device of FIG. 1 incorporating both a scroll and a pair of constant force springs.

FIG. 6 is another cross-sectional view of attached assembly 22 viewed from the top, wherein spring devices 61 and 62 are provided near the ends of shaft 16*b* to provide additional motive force during retraction (windup). The ends of shaft 16*b* are configured to run freely in counterbores 51*b*, to avoid particular lines of wear on scroll element 15 during winding and unwinding. Spring devices 61 and 62 may each be a constant force spring, fabricated as a coil of stainless steel with an exposed tab; 301 stainless steel is preferred. Such spring devices may function similarly to scroll element 15; like scroll element 15 they have a rotational stiffness and they resist extension when their exposed end is pulled away from the coiled portion. Suitable dimensions for the constant force springs include a thickness of 0.003 inches, a width of 0.187 inches, a length when fully extended of 12 inches, an inner diameter of 0.21 inches, an outer diameter of 0.30 inches, and an approximately constant pulling force during extension of 0.4 pounds. Thus they can provide additional motive force during retraction. An exposed end (tab) 63 of spring 61 is attached to pull bar 18*b*. As with scroll element 15, the inner diameter of spring 61 is preferably slightly larger than the diameter of shaft 16*b*, in order that the spring can spin freely on the shaft; this will have the desirable effect that during extension and refraction the spring will exert primarily a horizontal force on pull bar 18*b*. A shoulder 64 is machined into shaft 16*b* to help constrain the spring such that it coils uniformly during windup (retraction); the spring is effectively constrained between sidewall 52*b* and shoulder 64. Layers 54*b* of the scroll assembly are shown wound around shaft 16*b*, as in FIG. 5.

Figure 7:
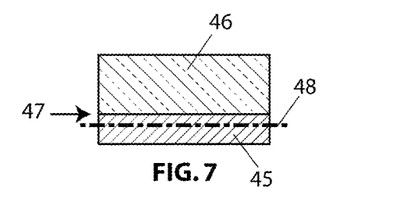
FIG. 7 is a schematic view of a substrate comprising both a metal layer and a plastic layer, showing the neutral plane with respect to bending.

FIG. 7 shows optional layers 45 and 46 of a display substrate, having a physical interface 47. Preferred materials and thicknesses include full hard 302/304 stainless steel with a thickness of 0.001 inches in layer 45, and heat treated PEN film with a thickness of 0.002 inches in layer 46. The PEN film is transparent, a requirement if the plastic film comprises touch circuits that overlay the display circuits. The PEN film comprising layer 46 may be heat treated to tailor its mechanical properties. Thin film transistors (TFTs) may be used to control pixel circuits of an electronic display. This is true for active matrix organic light emitting displays (AMOLEDs) and for active matrix liquid crystal displays (AMLCDs) as examples, wherein the TFTs are used for row-and-column addressing in a backplane circuit. To date TFTs have been primarily fabricated using polysilicon or amorphous silicon as the active junction semiconductor material. Polysilicon has the advantage over amorphous silicon of substantially higher carrier mobility; this leads to higher performing transistors having either a larger gain or a smaller size. This is particularly advantageous for AMOLEDs which require current control at each pixel site rather than voltage control. In addition, polysilicon TFTs may be suitable for providing an "integrated gate driver" wherein the scanning signals applied to the rows are generated locally by the TFT array. The simplified electrical connections enabled by polysilicon TFTs can contribute substantially to lowered cost and increased reliability. However, polysilicon requires a substantially higher processing temperature than amorphous silicon, a temperature out of the range of most available plastics. Thus polysilicon TFTs have traditionally been fabricated on glass substrates. However stainless steel is equally suitable from the thermal processing point of view, suitable for processing up to around 800° C.

The optional plastic layer may be used for touch circuits, which may employ capacitive sensing, and may comprise a multi-touch human interface. A preferred plastic material for layer 46 is heat treated PEN. The heat treatment involves stretching the material while heating to reduce subsequent shrinkage effects.

Certain embodiments of the current invention allow the use of a dual substrate: stainless steel for high temperature processing of polysilicon-based TFTs, and PEN for processing of touch circuits. The touch circuits may also require TFTs, but these typically have a lower performance requirement than the display drivers, and TFTs fabricated from amorphous silicon or other organic or inorganic semiconductors may be adequate. Despite using multiple layers, the form factor of the rolled up scroll assembly may be most attractive in a compact device. For example, for the layers defined above, and using a shaft diameter of 0.25 inches, the total diameter of the retracted scroll assembly can be less than 0.375 inches, while providing a 9-inch retractable display as shown in FIG. 3. An additional consideration is the radius of curvature tolerable by the TFTs and by the colorants used. Since the TFT films are very thin, typically a few nanometers thick, they can tolerate substantial curvature if they are close to the neutral plane of the total circuit assembly. Since the maximum stress induced in a film due to curvature is proportional to the ratio of film thickness to radius of curvature, use of the thinnest possible films is desirable. For example, polysilicon based TFTs having a thickness of a few nanometers may tolerate a radius of curvature less than 2 mm when they reside in the neutral plane. The location of the neutral plane can be calculated using the thickness and the stiffness of the contributing materials. The elastic modulus is a measure of material stiffness. Stainless steel has an elastic modulus around 193 GPa, while PEN has an elastic modulus around 5 GPa. Thus the position of the neutral plane can be calculated, with a result as shown in FIG. 7, wherein the neutral plane 48 is shown close to surface 47 of the stainless steel substrate where the TFTs are fabricated. The colorant materials in the pixel construction may be organic materials having a low stiffness and a high compliance, and they perform better than the relatively brittle polysilicon material when repeatedly subjected to cycles of winding and unwinding. Good performance involves avoidance of cracks and other stress related defects. This performance may be fatigue tested, since many thousands of deployment cycles may be required for the retractable device.

Notwithstanding the potential advantages of using multiple substrate layers in scroll assembly 13, a single plastic or metal layer may be used, with thin film circuits fabricated thereon. The single plastic or metal layer may be heat treated to create a scroll comprising a substantial coil set, and the coil set may be advantageous for building a simple and low cost flexible device requiring only a slender support element or elements. For example, the curvature produced by a coil set may work to counteract the effects of gravity in an extended flexible device. Heat treating to create the enhanced coil set may be performed before or after forming the thin film circuits. If performed before, then the substrate may be held flat during processing of the thin film circuits, for example by using a vacuum chuck or a clamping device at the periphery.

Figure 8:
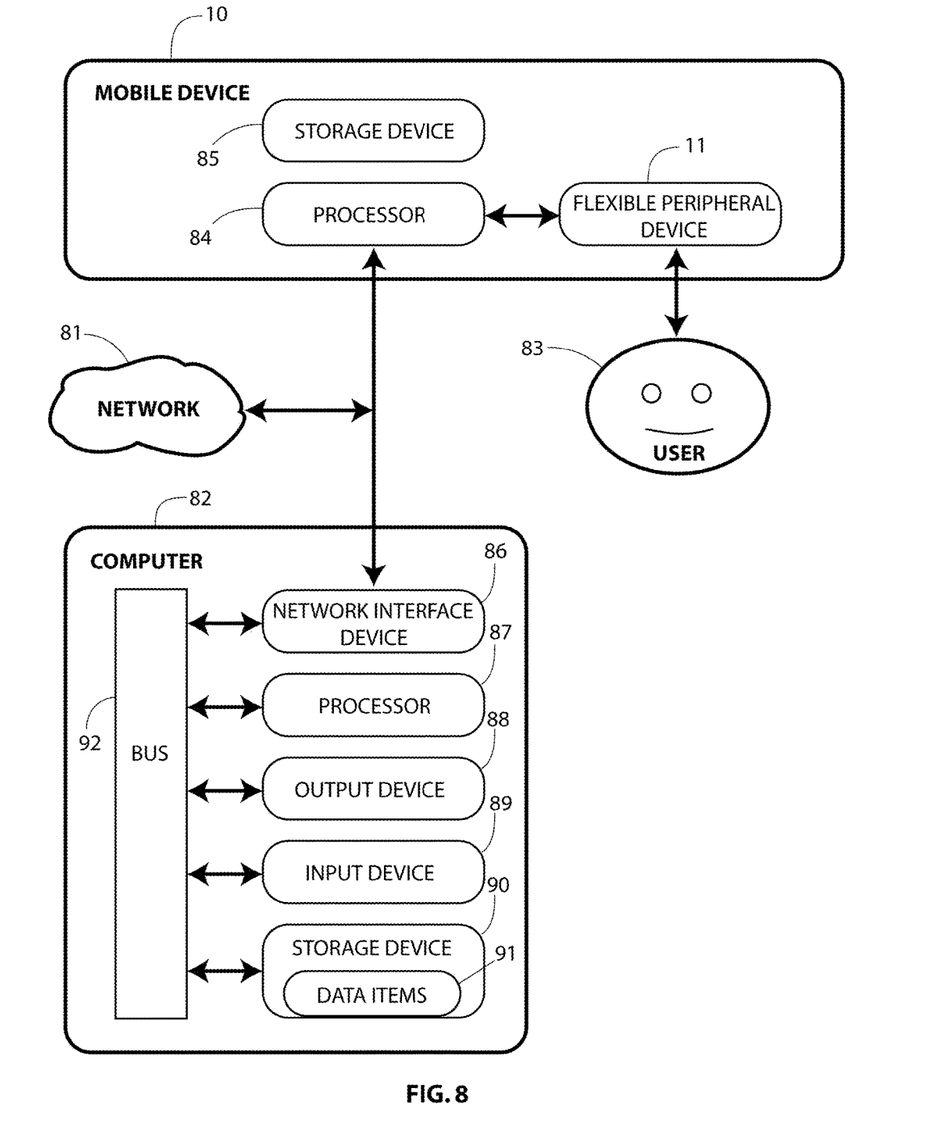
FIG. 8 is a system block diagram showing information flows.

FIG. 8 is a system block diagram showing mobile device 10 of the current invention in the context of a network 81, a remote computer 82, and a user 83. Mobile device 10 comprises a processor 84, a storage device comprising memory circuits 85, and a flexible peripheral device 11 as previously described. Network 81 may be the Internet or another network. Remote computer 82 is shown with a network interface adaptor 86, for interfacing to the network. Computer 82 also comprises a processor 87, an output device 88, an input device 89, a storage device 90 for storing data items 91, and an interconnecting bus 92. Thus a system environment is established, with mobile device 10 capable of connecting to external resources through a network, wherein mobile device 10 is supplemented by a flexible peripheral device 11 for the convenience of the user 83. In the diagram, a fixed device of the current invention may replace mobile device 10.

Figure 9:
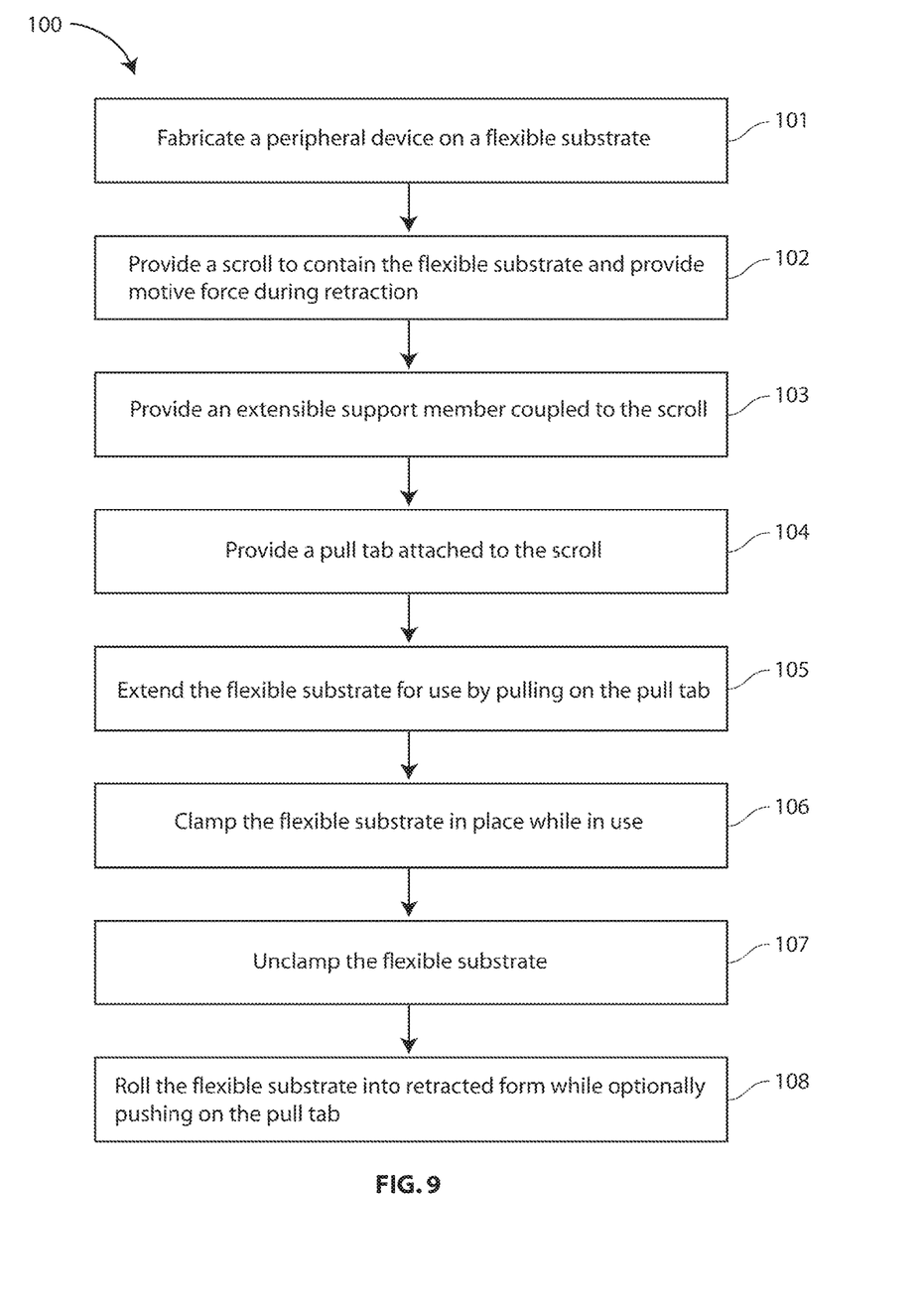
FIG. 9 is a flow chart depicting a method for deploying a flexible mobile device.

FIG. 9 illustrates a method 100 of the current invention. The steps of method 100 include fabricating a peripheral device on a flexible substrate 101, providing a scroll to contain the flexible substrate and provide motive force during retraction 102, providing an extensible support member coupled to the scroll 103, providing a pull bar attached to the scroll 104, extending the flexible substrate for use by pulling on the pull bar 105, clamping the flexible substrate in place while in use 106, unclamping the flexible substrate when done 107, and rolling the flexible substrate into retracted form while optionally pushing on the pull bar 108.

Numerous benefits are achieved by way of the present invention over conventional techniques. For example, embodiments of the present invention provide a rollable display screen Numerous benefits are achieved by way of the present invention over conventional techniques. For example, embodiments of the present invention provide a rollable display screen that implements a large and stable viewing area when deployed in its expanded form, and a compact form when rolled up. The embodiments provide combinations of a host computing device or communications device, together with a light weight peripheral component. The peripheral component is convenient to use because it is readily available, perhaps in a pocket-sized system, and a user can deploy it easily. Each cycle of deployment typically involves extension into the extended form for use and retraction into the retracted form for storage. The current invention enables a high endurance of many thousands of deployment cycles due to its simple and robust features. It also enables a low manufacturing cost because of its simple design comprising simple components that are easily assembled together, and with no motor requirement. The motive force for extension can be provided by the user. When the user performs mechanical work to extend the device, mechanical energy is stored in the scroll element and optionally in the constant force springs. This stored mechanical energy can be recovered during retraction, with a contributing push from the user if necessary.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:
1. A device comprising:
   a processor;
   a memory coupled to the processor, wherein the memory is encoded with instructions that are executable by the processor to provide content signals;
   a display screen extendable from an enclosure of the device to present an extended portion lying in a display plane, wherein the extended portion comprises display pixels configured to display content using the content signals,
   a cover surrounding at least a portion of the enclosure of the device,
   a planar extensible support member outside of the enclosure and extensible from the cover, wherein the planar extensible support member lies in a support plane parallel to the display plane, wherein the planar extensible support member is operable to extend in a telescoping manner, and wherein the planar extensible support member supports the display screen when the display screen is extended from the enclosure; and
   a clamping assembly within the enclosure, wherein the clamping assembly is configured to press against the display screen when the display screen is extended from the enclosure, and wherein the clamping assembly comprises an actuator configured to be activated by the processor to press the clamping assembly against the display screen when the display screen is extended from the enclosure.
2. The device of claim 1 wherein the planar extensible support member supports the display screen when the dis- play screen is extended from the enclosure by providing a rigid structure to resist forces applied to the display screen.

3. The device of claim 1 wherein the display screen comprises a scroll element, wherein a leading edge of the scroll element is attached to a pull bar and the pull bar is attached to the planar extensible support member.

4. The device of claim 3 wherein the planar extensible support member is attached to the pull bar such that movement of the pull bar away from the enclosure extends the display screen and the planar extensible support member in unison.

5. The device of claim 1 wherein the display screen comprises a plurality of layers.

6. The device of claim 5 wherein the plurality of layers comprises a metal layer.

7. The device of claim 5 wherein the plurality of layers comprises a plastic layer.

8. The device of claim 3 further comprising a constant force spring attached to the scroll element.

9. The device of claim 1 wherein each of the display pixels comprises display circuits operable to emit or reflect light, wherein the display circuits are coupled to the processor.

10. The device of claim 1 wherein the display screen is also operable as a touch screen.

11. A device comprising:
an enclosure containing a processor;
a scroll element having a retracted form and an extended form, wherein the retracted form is contained within the enclosure and the extended form unrolls from the enclosure to present an extended portion lying in a first plane, wherein the extended portion comprises transducers that are coupled to the processor, wherein a leading edge of the extended portion is attached to a pull bar and the pull bar is attached to a planar extensible support member, wherein the planar extensible support member lies in a second plane parallel to the first plane, wherein the planar extensible support member is operable to extend in a telescoping manner, and wherein the planar extensible support member supports the scroll element when the scroll element is extended from the enclosure; and
a clamping assembly within the enclosure, wherein the clamping assembly is configured to press against the scroll element when the scroll element is extended from the enclosure, and wherein the clamping assembly comprises an actuator configured to be activated by the processor to press the clamping assembly against the scroll element when the scroll element is extended from the enclosure.

12. The device of claim 11 wherein the transducers convert electrical signals originating from the processor to display an image.

13. The device of claim 11 wherein the transducers convert touch input on a surface of the extended portion to signals provided to the processor.

14. The device of claim 11 wherein the transducers produce sound, heat, or cooling.

15. A method comprising:
extending a scrollable member from an enclosure of a flexible device, the flexible device comprising:
flexible circuits on the scrollable member;
a shaft on which the scrollable member can freely rotate;
a pull bar attached at a leading edge of the scrollable member;
a cover surrounding at least a portion of the enclosure; and
a planar extensible support member outside of the enclosure and attached to the scrollable member, wherein the planar extensible support member lies in a first plane, and wherein the planar extensible support member is operable to extend in a telescoping manner from the cover;
supporting the scrollable member in a fixed extended position using the planar extensible support member, wherein the fixed extended position of the scrollable member lies in a second plane parallel to the first plane;
clamping the scrollable member in the fixed extended position using an actuator configured to be activated by a processor, wherein the actuator is configured to press a clamping assembly against the scrollable member; and
releasing the scrollable member to retract.

16. The device of claim 1, wherein the planar extensible support member is slidably extensible from the enclosure.

* * * * *